United States Patent
Meissner et al.

(10) Patent No.: US 11,847,035 B2
(45) Date of Patent: Dec. 19, 2023

(54) FUNCTIONAL TEST OF PROCESSOR CODE MODIFICATION OPERATIONS

(71) Applicant: International Business Machines Corporation, Armonk, NY (US)

(72) Inventors: Charles Leverett Meissner, Austin, TX (US); Elena Tsanko, Cedar Park, TX (US); Brenton Yiu, Austin, TX (US); John Martin Ludden, Essex Junction, VT (US); Bryan G. Hickerson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 17/409,059

(22) Filed: Aug. 23, 2021

(65) Prior Publication Data

US 2023/0058716 A1     Feb. 23, 2023

(51) Int. Cl.
*G06F 11/00*     (2006.01)
*G06F 11/22*     (2006.01)
*G06F 11/36*     (2006.01)

(52) U.S. Cl.
CPC .......... *G06F 11/22* (2013.01); *G06F 11/3688* (2013.01)

(58) Field of Classification Search
CPC ... G06F 11/22; G06F 11/3688; G06F 11/3684
USPC ...................................................... 714/1–57
See application file for complete search history.

(56) References Cited

U.S. PATENT DOCUMENTS

| | | | |
|---|---|---|---|
| 7,069,549 B2 | 6/2006 | Charnell et al. | |
| 7,076,691 B1 * | 7/2006 | Dobberpuhl | G06F 11/2028 714/13 |
| 7,426,668 B2 * | 9/2008 | Mukherjee | G01R 31/31724 714/719 |
| 7,539,979 B1 * | 5/2009 | Nir-Buchbinder | G06F 11/3632 717/130 |
| 7,784,044 B2 | 8/2010 | Buban et al. | |
| 8,380,758 B1 * | 2/2013 | Stephens | G06F 9/45512 370/392 |
| 8,826,239 B2 | 9/2014 | Sawano | |
| 8,930,683 B1 | 1/2015 | Spertus | |
| 9,606,905 B2 | 3/2017 | Keromytis et al. | |
| 10,572,361 B2 | 2/2020 | Schuller et al. | |
| 10,725,889 B2 | 7/2020 | Chen et al. | |
| 2002/0144256 A1 | 10/2002 | Budhiraja et al. | |
| 2006/0161897 A1 * | 7/2006 | Biberstein | G06F 11/3632 717/124 |
| 2007/0174686 A1 * | 7/2007 | Douglas | G06F 11/2097 714/13 |

(Continued)

*Primary Examiner* — Sarai E Butler
(74) *Attorney, Agent, or Firm* — Scully, Scott, Murphy & Presser, P.C.

(57) ABSTRACT

Methods and systems for testing a functionality of a code modification operation are described. In an example, a processor can include a processor pipeline comprising one or more execution units. The processor pipeline can execute a first thread. The processor pipeline can further execute a second thread concurrently with the execution of the first thread. The second thread can be executed to modify the first thread using a code modification operation. The processor can further include a test module configured to validate a functionality of the code modification operation based on a result of the modified first thread.

20 Claims, 11 Drawing Sheets

(56) References Cited

U.S. PATENT DOCUMENTS

| | | | |
|---|---|---|---|
| 2007/0180438 A1* | 8/2007 | Suba | G06F 8/4441 |
| | | | 717/151 |
| 2009/0063903 A1* | 3/2009 | Smolski | G06F 11/3664 |
| | | | 714/E11.207 |
| 2011/0265068 A1* | 10/2011 | Elnozahy | G06F 8/456 |
| | | | 717/149 |
| 2014/0359587 A1* | 12/2014 | Villadsen | G06F 8/451 |
| | | | 717/143 |
| 2016/0077944 A1* | 3/2016 | Kodama | H04L 43/16 |
| | | | 714/33 |
| 2019/0303265 A1* | 10/2019 | Martin | G06F 9/30043 |

\* cited by examiner

600

```
Main Thread 640                                    Modifier Thread 642
flag = FALSE;

601                      602
L_Loop:                      /                        /
    Random instructions    /                        /
    Multiword instruction prefix  ←———— Overwrite with
                                              "b    L_Test_Sequence"
L_Mword_Split:
    Multiword instruction suffix
    Random instructions
    if (flag)
        goto L_Loop_Exit;
    b    L_Loop L_Test_Sequence:
    set flag = TRUE
    b    L_Mword_Split L_Loop_Exit:
```

FIG. 6

FUNCTIONAL TEST OF PROCESSOR CODE MODIFICATION OPERATIONS

BACKGROUND

The present invention relates to executions in a processor and more specifically to functional tests for validating processor code modification operations during execution of the processor.

Processors typically process instructions by executing the instructions in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel. A sequence of instructions can sometimes be referred to as a thread. A processor core, or multiple processor cores, can perform multithreading—such as executing multiple threads or instructions streams concurrently. In multithreading, the threads may be independent from one another, and may share various resources of the processor core or the multiple processor cores. Multithreading may be used in conjunction with pipelining to increase processing speed.

In an example, a processor can execute self-modifying code that modifies its own instructions while it is executing, where the self-modification can be intentional. For example, the processor can execute a modifier thread to modify code of a main thread being executed by the processor. In an example, the modifier thread can modify the main thread using different processor code modification operations among code modification features such as concurrent modification and execution (CMODX) and synchronous cross-thread code modification. The CMODX feature can be used for, for example, handshaking and debugger patching. Some CMODX processes may have restrictions on the types of instructions allowed, such as limiting overwriting instructions or overwritten instructions to be fetched from limited set of instructions (e.g., patch instructions). Synchronous cross-thread code modification can be used for, for example, changing one substantial segment of code to another segment of code. In an example, a main thread can be a thread running a code stream with a given scenario, and a modifier thread can be a thread that can modify the code stream of the main thread with either a CMODX or a synchronous cross-thread code modification process.

In an example, a processor architecture including the CMODX and/or the synchronous cross-thread code modification features can also execute threads having variable-length instructions. The capability to execute variable-length instructions can allow a processor to execute multiword instructions, such as instructions having a size more than one of the smallest instruction size allowed. For example, the smallest instructions size allowed can be one byte for x86 and RISC-V architectures, a halfword for ARM (Thumb), a 32-bit word for PowerPC, etc. In an example, a prefix of an instruction can be a beginning part of a split multiword instruction, and a suffix can be an ending part of the split multiword instruction. The prefix and suffix can each include multiple words. For example, for a split multiword instruction including two 32-bit words, the prefix can be the first 32-bit word and the suffix can be the second 32-bit word.

SUMMARY

The summary of the disclosure is given to aid understanding of the computer processing systems and methods of performing functional tests to validate modifier threads being executed concurrently with normal operations or execution of a main thread, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In some examples, a processor configured to test a functionality of a code modification operation is generally described. The processor can include a processor pipeline comprising one or more execution units. The processor pipeline can execute a first thread. The processor pipeline can further execute a second thread concurrently with the execution of the first thread. The second thread can be executed to modify the first thread using a code modification operation. The processor can further include a test module configured to validate a functionality of the code modification operation based on a result of the modified first thread.

In some examples, a computer system configured to test a functionality of a code modification operation is generally described. The computer system can include a memory and a processor. The processor can include a processor pipeline. The processor pipeline can include one or more execution units. The processor pipeline can be configured to execute a first thread. The processor pipeline can be further configured to execute a second thread concurrently with the execution of the first thread. The second thread can be executed to modify the first thread using a code modification operation. The computer system can further include a test module configured to validate a functionality of the code modification operation based on a result of the modified first thread.

In some examples, a computer-implemented method for testing a functionality of a code modification operation is generally described. The computer-implemented method can include executing, by a processor, a first thread. computer-implemented method can further include executing, by the processor, a second thread concurrently with the execution of the first thread. The second thread can be executed to modify the first thread using a code modification operation. The computer-implemented method can further include validating, by the processor, a functionality of the code modification operation based on a result of the modified first thread.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 illustrates another example implementation of functional tests of processor code modification operations in accordance with an embodiment.

DETAILED DESCRIPTION

The following description is made for illustrating the general principles of the invention and is not meant to limit the inventive concepts claimed herein. In the following detailed description, numerous details are set forth in order to provide an understanding of a processor, its architectural structure, and its method of operation, however, it will be understood by those skilled in the art that different and numerous embodiments of the processor, architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The methods and systems described herein provides functional tests to test the modifier thread. For example, the functional tests can test or validate CMODX features, the interactions of variable-length instructions with CMODX feature, and synchronous cross-thread code modifications. A test can include different forms of checking. For example, some tests can include creation of a scenario without explicit checking processes in order to create a stimulus that might create an observed fail on a simulation or hardware checker. Some tests can include specific directed checking, or may rely on multi-pass consistency checking processes (e.g., running multiple times to see if the results from the multiple runs are consistent). The methods and systems described herein can implement functional test scenarios for a processor in which a modifier thread modifies the code of the main thread being executed, or about to be executed, by the processor. The scenarios can target CMODX features and/or synchronous cross-thread code modifications, and failure modes specific to variable-length instructions.

Figure 1:
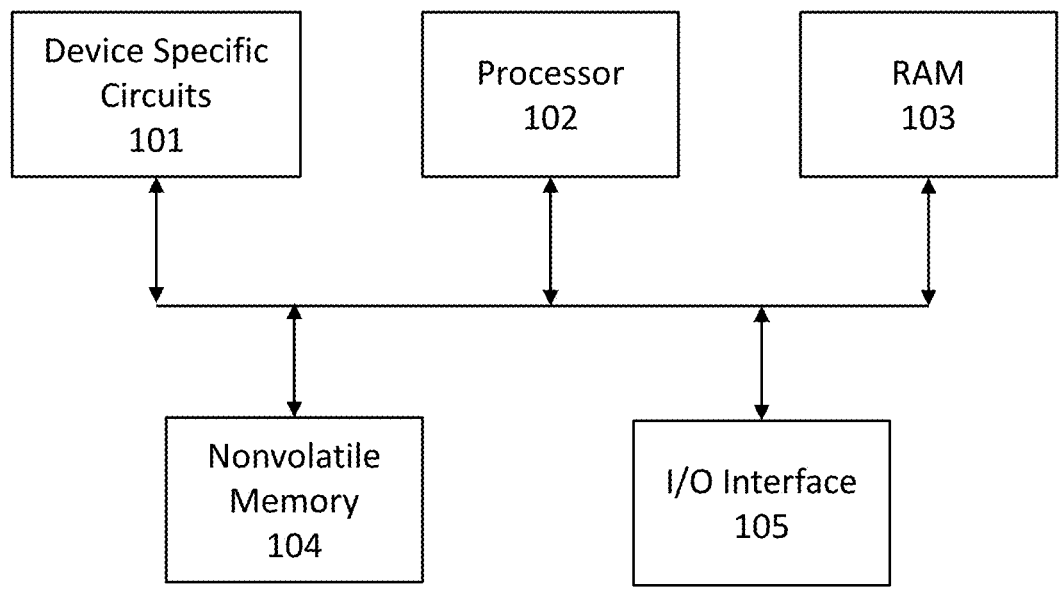
FIG. 1 depicts a general computing or data processing system in accordance with an embodiment.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
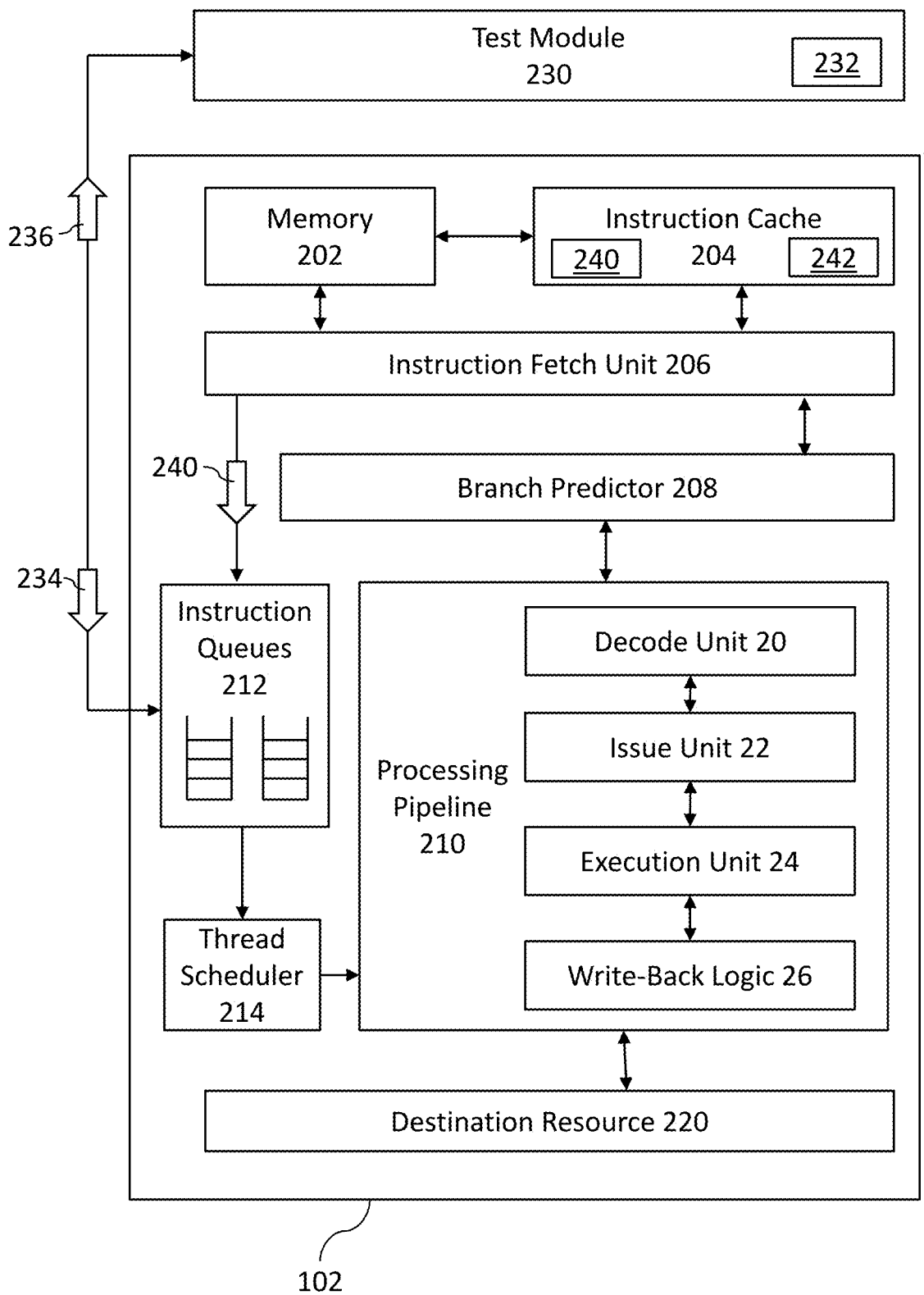
FIG. 2 a block diagram of a processor in accordance with an embodiment

FIG. 2 depicts a block diagram of a processor 102 according to an embodiment. The processor 102 may include at least a memory 202, an instruction cache 204, an instruction fetch unit 206, a branch predictor 208, a processor pipeline or a processing pipeline 210, and a test unit 230. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to provide instructions in an 8-way set associative structure.

Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. In some examples, the instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102.

Branch instructions (or "branch") can be either unconditional, meaning that the branch is taken every time that the instruction is encountered in the program, or conditional, meaning that the branch is either taken or not taken, depending upon a condition. The processor 102 can provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. The branch predictor 208 can attempt to predict the outcome of conditional branch instructions in a program before the branch instruction is executed. If a branch is mispredicted, all of the speculative work, beyond the point in the program where the branch is encountered, must be discarded. For example, when a conditional branch instruction is encountered, the processor 102 may predict which instruction will be executed after the outcome of the branch condition is known. Then, instead of stalling the processing pipeline 210 when the conditional branch instruction is issued, the processor may continue issuing instructions beginning with the predicted next instruction.

In a conditional branch, control can be transferred to the target address depending upon the results of a previous instruction. Conditional branches may be either resolved or unresolved branches depending on whether the result of the previous instruction is known at the time of the execution of the branch. If the branch is resolved, then it is known whether the branch is to be executed. If the conditional branch is not executed, the next sequential instruction stream immediately following the branch instruction is executed. If the conditional branch is executed, then the instruction stream starting at the target address is executed.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch can be discarded from the various units of processor 102. The execution unit 24 may include a plurality of execution units, such as fixed-point execution units, floating-point execution units, load/store execution units, and vector multimedia execution units. The execution unit 24 may also include specialized branch predictors to predict the target of a multi-target branch. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an embodiment, processor 102 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

In an example, the processor 102 can be a processor configured to execute self-modifying code. The processor 102 can use one or more instruction queues 212 to collect instructions from the one or more different threads. The instruction fetch unit 206 can fetch instructions stored in the instruction cache 204 and fill the instruction queues 212 with the fetched instructions. In an example, for self-modifying code execution, the instruction fetch unit 206 can fetch a main thread 240 and a modifier thread 242 stored in the instruction cache 204 and fill the instruction queues 212 with the main thread 240 and modifier thread 242. The thread scheduler 214 can schedule the main thread 240 and the modifier thread 242 to be executed by the processing pipeline 210 concurrently, such that the main thread 240 can be modified by the modifier thread 242 during execution. The modifier thread 242 can include processor code modification operations or instructions that can modify the main thread 240 using various code modification schemes, such as concurrent modification and execution (CMODX) and synchronous cross-thread code modifications. The CMODX scheme can cause the processor 102 to modify code in the main thread 240 with code from the modifier thread 242 in a defined way (e.g., using predefined definitions, rules, syntax, etc., under the CMODX scheme) while the main thread 240 is being executed by the processing pipeline 210. For example, operations among the CMODX scheme may have restrictions on the types of instructions allowed, such as limiting overwriting instructions or overwritten instructions to be fetched from a specific set of patch instructions.

Synchronous cross-thread code modification can be used by the processor 102 to replace a segment of code (e.g., more than one instruction) in the main thread 240 with another segment of code from the modifier thread 242.

In another example, the processor 102 can utilize the self-modifying code execution capability to perform one or more functional tests of one or more modifier threads stored in the instruction cache 204. For example, one or more test threads 232 can be stored in the test unit 230, where the test threads 232 can include instructions or codes for testing different processor code modification operations from different code modification features or schemes (e.g., CMODX and synchronous cross-thread code modifications). The test threads 232 can be executed in the processing pipeline 210 currently with a main thread to modify the main thread during execution of the main thread 240, or shortly before execution of the main thread 240. The test unit 230 can fill the instruction queues 212 with one or more test threads from the test threads 232. In an example, to test a specific processor code modification operation, the processor 102 can identify a thread being executed, or about to be executed, by the processing pipeline 210 (e.g., main thread 240) that can be modified by the specific processor code modification operation. Based on the identified main thread 240, the processor 102 can identify a test thread (or a modifier thread) 234 among the test threads 232 that includes the specific processor code modification operation. For example, the main thread 240 can be the identified thread being executed by the processing pipeline 210, and the main thread 240 can include a loop. The processor 102 can identify a test thread 234 that includes a loop-breakout branch operation that can replace an instruction in a loop of the main thread 240 with a branch instruction to exit the loop. The thread scheduler 214 can schedule the main thread 240 and the test thread 234 to be executed by the processing pipeline 210 concurrently.

The test thread 234 can be executed as a modifier thread to modify one or more segments, or code, of the main thread 240. In an example, the modification being performed by the test thread 234 can introduce an intended failure to the main thread 240. For example, to test a loop-breakout branch patch operation defined CMODX operations, the test thread 234 can include an instruction to modify the main thread 240 with a branch instruction defined under CMODX definitions to force the main thread 240 to exit the loop (e.g., introducing a failure in the loop). The test module 230 can validate whether the CMODX loop-breakout branch patch operation is functioning correctly based on a result 236 of the modified version of the main thread 240. The result 236 can indicate whether the loop in the main thread 240 was exited, or whether the loop in the main thread 240 continues, in response to executing the modified version of the main thread 240. If the result 236 indicates that the loop exited, then the CMODX loop-breakout branch patch operation can be validated as being functioning correctly. If the result 236 indicates that the loop continues, overriding the branch instruction from the test thread 234, then the CMODX loop-breakout branch patch operation can be considered as not functioning correctly.

Figure 3:
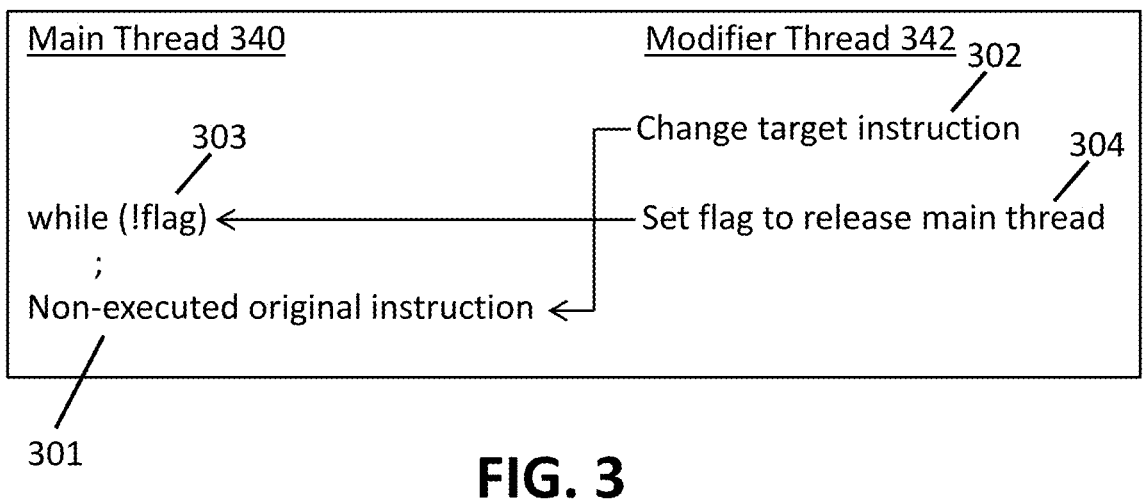
FIG. 3 illustrates an example implementation of functional tests of processor code modification operations in accordance with an embodiment.

FIG. 3 illustrates an example implementation of functional tests of processor code modification operations in accordance with an embodiment. An example pseudocode for a test 300 is shown in FIG. 3. The test 300 can be a test for a release flag operation defined under the CMODX definitions. A main thread 340 and a modifier thread 342 can be executed in parallel, where execution of the modifier thread 342 can modify one or more instructions among the main thread 340. For example, execution of the modifier thread 342 can insert one or more additional instructions into the main thread 340, or replace one or more instructions in the main thread 340 with one or more instructions from the modifier thread 342. The main thread 340 in the test 300 can include an instruction 301 that is nearly executed, but is replaced with a instructions 302 in a modifier thread 342 before execution. The main thread 340 may reach a certain point and waits on the modifier thread 342 to set a flag 303 (by an instruction 304) to release the main thread 340, allowing the main thread 340 to proceed. Upon the flag release 303, if a result of an execution of the main thread 340 (modified by the modifier thread 342) indicates that the instruction 302 from the modifier thread 342 is performed, then the CMODX release flag operation can be validated by the test module (see FIG. 2) as functioning correctly. If the result indicates that the original instruction 301 is performed, instead of the instruction 302 from the modifier thread 342, then the CMODX release flag operation can be considered as not functioning correctly. Note that the test 300 can be consistency-checkable (e.g., repeating the test multiple times to check whether the same result happens repeatedly). In an example, the test 300 can be used for testing whether speculative instructions are flushed correctly. For example, the main thread 340 can include one or more speculative instructions (e.g., the instruction 301) that can be flushed upon a CMODX flag release set by the modifier thread 342. If the CMODX release flag functions correctly, then the speculative instructions may be flushed correctly as well.

In an example, the test 300 can also be used for testing whether speculative instructions of a specific type are flushed correctly. For example, the instruction 302 can be a CMODX patch instruction overwrite operation that overwrites an attention instruction in the main thread with another instruction that attempts to override the attention instruction. An attention instruction can be a special purpose instruction added for testing purposes, such that if the attention is not overridden, then a fail condition occurs. In an example, the instruction 301 in the main thread 340 can include an attention instruction. The instruction 302 can be a branch instruction that branches over the attention instruction (e.g., skip over the attention) in the main thread 340, meaning the attention instruction will be overridden, and the fail flag will not be raised, allowing the main thread 340 to continue. In another example, the instruction 302 can be a single-word non-branch instruction, such as a trap or a no-operation (nop) instruction, that can overwrite the attention instruction in the main thread 340. In another example, the instruction 302 can be a multiword no-operation (pnop) prefix, or a branch condition that can be 8 bytes ahead (e.g., two 4-byte instructions ahead), or a branch condition that can be a full prefixed 8-byte instruction (e.g., 8-byte executable instruction that can be a multiword prefix), that may overwrite the attention instruction, a random prefix instruction, or a pair of word instructions in the main thread. If a result of the main thread 340 indicates that there is a fail condition, then the CMODX patch instruction overwrite operation may not be functioning correctly since a fail condition indicates the attention was not overridden. If the result of the main thread 340 indicates that there is no fail condition, then the CMODX patch instruction overwrite operation can be validated as functioning correctly. The tests for the CMODX patch instruction overwrite operation can be used for testing whether specific type of instructions (e.g., attention instructions) are flushed correctly or not. For example, the main thread 340 can include one or more speculative instructions (e.g., the instruction 301), including an attention instruction, that can be flushed upon a CMODX flag release (e.g., release flag 303) set by the modifier thread 342. If the CMODX release flag (e.g., replacing instruction 303 with instruction 304) functions correctly, and the attention instruction (e.g., instruction 301) is overridden by the CMODX patch instruction overwrite operation (e.g., instruction 302), then the speculative instructions including the attention instruction may be flushed correctly as well.

In another example, the instruction 302 in the modifier thread can be a CMODX operation writing a cacheable load to overwrite a never-executed cache-inhibited load (e.g., instruction 301) in the main thread 340. A variant of this test can be the reverse, where the instruction 302 can be a CMODX operation to write a cache-inhibited load to overwrite a cacheable load in the main thread 340 that will never be executed. The intended failure mode introduced by the modifier thread 342 for this test is that the cache-inhibited load can be started speculatively or partially started, and the original cacheable load becomes cache-inhibited (or the reverse for the variant case). Further, the cacheable load and the cache-inhibited load can be loading the same address. Therefore, switching between the cacheable load and the cache-inhibited load with the same address may confuse the processor and introduces an intended fail condition. A result of the main thread 340 can indicate whether a cacheable load or a cache-inhibited load was executed. If the original instruction 301 in the main thread 340 was a cache-inhibited load and the result indicates that a cacheable load (e.g., instruction 302) was executed, then the release flag (e.g., replacing instruction 303 with instruction 304) function can be validated as functioning correctly because the result of the main thread 340 indicates the replaced instruction 302, instead of the original instruction 301, was executed.

Figure 4:
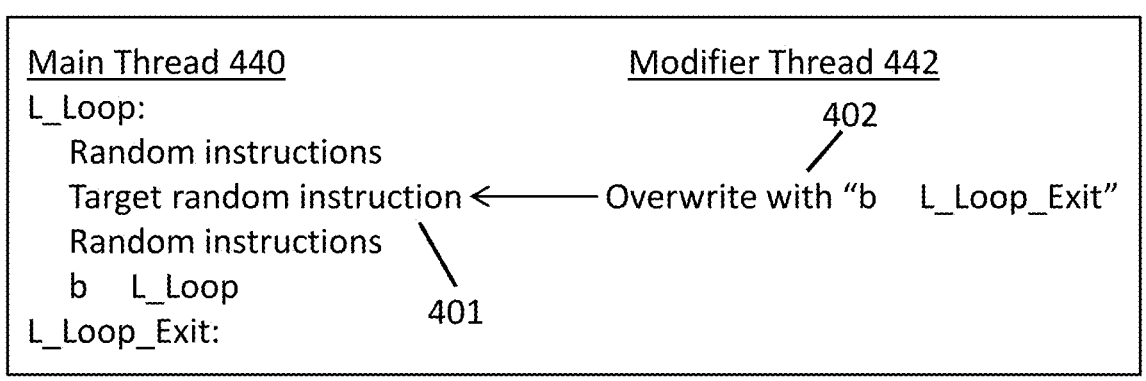
FIG. 4 illustrates another example implementation of functional tests of processor code modification operations in accordance with an embodiment.

FIG. 4 illustrates another example implementation of functional tests of processor code modification operations in accordance with an embodiment. An example pseudocode for a test 400 shown in FIG. 4 is a test for a CMODX patch-to-break-loop operation that can break out of a loop of instructions. A main thread 440 and a modifier thread 442 can be executed in parallel, where execution of the modifier thread 442 can modify one or more instructions among the main thread 440. For example, execution of the modifier thread 442 can insert one or more additional instructions into the main thread 440, or replace one or more instructions in the main thread 440 with one or more instructions from the modifier thread 442. In the test 400, the target instruction 401 in the main thread 440 for replacement is in a loop, and is executed zero or more times before the modifier thread 442 replaces it with an instruction 402. In the test 400, the instruction 402 can break out of the loop in one of several ways and end the test. For example, in FIG. 4, the instruction 402 can be a loop-breakout branch instruction. The main thread 440 can include a loop having a segment of mixed and arbitrary instructions. One of the instructions in the loop, such as the instruction 401, can be replaced by the instruction 402 to branch to exit the loop. In an example, the test 400 can be used for identifying a hang or failure to get an update from a CMODX patch. For example, if an update is not seen during execution of the main thread 440, and therefore the test has a software hang. In an example, the test 400 can show that for all types of instructions, the CMODX patch update can be eventually observed and the code stream of the main thread 440 can continue after the update. At the micro-architectural level, the intended failure mode introduced by the modifier thread 442 can cause a hang or failure to observe the update in the instruction cache from a data cache of the processor 102 (see FIG. 2). In an example, the processor 102 can have separate instruction and data caches for the level 1 caches, and the instruction cache may snoop changes being made to the data cache. A result of the main thread 440, modified by the modifier thread 442, can indicate whether the modified main thread exited the loop or not. If the result indicates that the main thread 440, modified by the modifier thread 442, exited the loop, then the CMODX patch-to-break-loop operation can be validated as functioning correctly.

Figure 5:
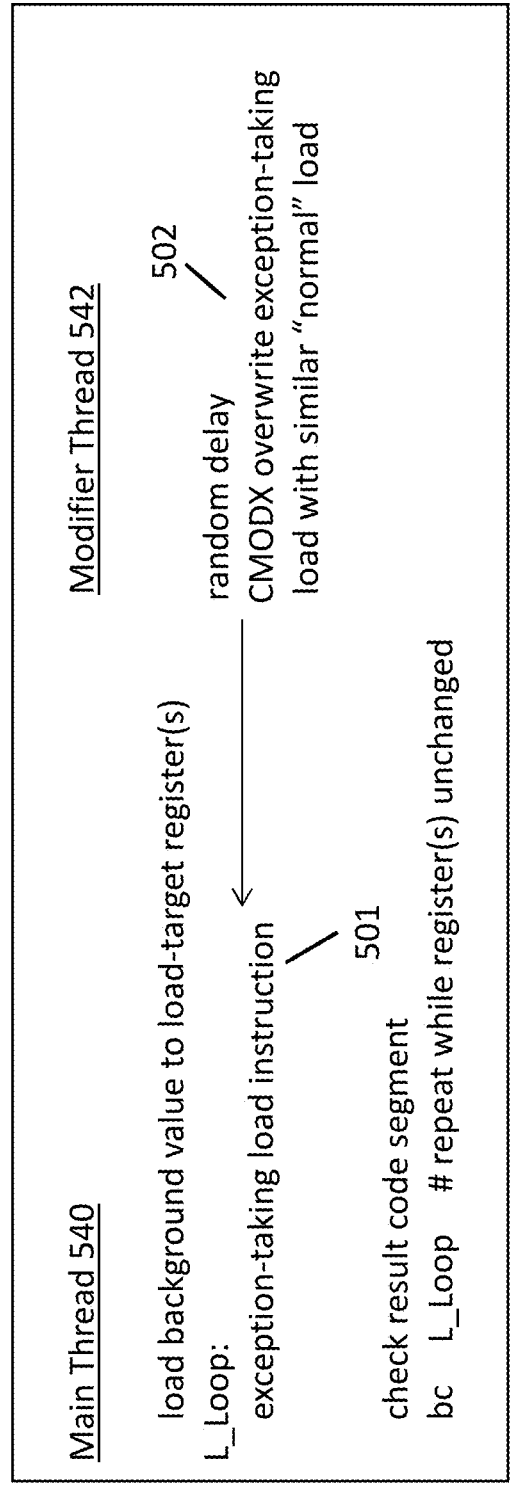
FIG. 5 illustrates another example implementation of functional tests of processor code modification operations in accordance with an embodiment.

FIG. 5 illustrates another example implementation of functional tests of processor code modification operations in accordance with an embodiment. An example pseudocode for a test 500 shown in FIG. 5 is a test for a CMODX operation of replacing an exception-taking load instruction with a normal load (e.g., not exception-taking). A main thread 540 and a modifier thread 542 can be executed in parallel, where execution of the modifier thread 542 can modify one or more instructions among the main thread 540. For example, execution of the modifier thread 542 can insert one or more additional instructions into the main thread 540, or replace one or more instructions in the main thread 540 with one or more instructions from the modifier thread 542. In the test 500, the main thread 540 can include an instruction 501. The instruction 501 can be a load that takes a synchronous exception. The instruction 501 can be replaced, using the CMODX feature, by an instruction 502 in the modifier thread 542. The instruction 502 can be a similar normal load using the same address register and the same target registers. The test 500 can include an instruction set architecture (ISA) level check, such as checking for occurrences of the normal load in the instruction 502 and checking whether the loop exits, plus collateral damage checking.

In a first example, the instruction 501 can be a load multiple word instruction that performs an unaligned access in little endian mode, which takes an alignment exception. The normal load instruction 502 that replaces the instruction 501 can be is a single-word load that uses the same address register and one of the same target registers. In a second example, the instruction 501 can be a load-and-reserve instruction that performs an unaligned access, which takes an alignment exception. The normal load instruction 502 that replaces the instruction 501 can be a non-reserve load that uses the same address and target register. For both the first and second examples, the test 500 can exercise the pipeline logic for the flush required by the exception indicated in instruction 501, with one intended failure mode being that the normal load completes but the data isn't loaded. Thus, if a result of the modified main thread 540, modified by the modifier thread 542, indicates that the normal load in instruction 502 is completed but data is not loaded, then the CMODX operation of replacing an exception-taking load can be validated as functioning incorrectly.

FIG. 6 illustrates another example implementation of functional tests of processor code modification operations in accordance with an embodiment. An example pseudocode for a test 600 shown in FIG. 6 is a test for a CMODX operation relating to patch-to-break-loop operations based on modification of a prefix in a multiword instruction in a main thread 640. The main thread 640 and a modifier thread 642 can be executed in parallel, where execution of the modifier thread 642 can modify one or more instructions among the main thread 640. For example, execution of the modifier thread 642 can insert one or more additional instructions into the main thread 640, or replace one or more instructions in the main thread 640 with one or more instructions from the modifier thread 642. In the test 600, the main thread 640 includes a loop that has a multiword instruction 601. The modifier thread 642 includes a CMODX instruction 602 that writes a branch over the prefix of the multiword instruction 601. The instruction 602 can break out of the loop in the main thread 640, and branches to a suffix of the multiword instruction 601, which is also a valid instruction.

In addition to testing whether the CMODX change (e.g., instruction 602) is eventually observed or not, the test 600 may also test whether the instruction cache, the instruction fetch unit, and the pre-decode buffer that handle multiword instructions, are handling multiword instructions correctly. The intended failure mode introduced by the modifier thread 642 in the test 600 can include incorrectly treating the suffix of a multiword instruction in the main thread 640 as a standalone instruction. A result of the modified thread 642 can indicate whether the suffix of a multiword instruction in the main thread 640 is executed as a standalone instruction. In response to the result of the modified thread 642 indicating that the suffix of a multiword instruction is treated as a standalone instruction, the CMODX operation in the instruction 602 can be validated as functioning correctly. Note that the changes to the prefix of multiword instructions rather than the suffix is a result of the processor (e.g., processor 102 in FIG. 2) being configured to have the capability of modifying a prefix of a multiword instruction.

Figure 7:
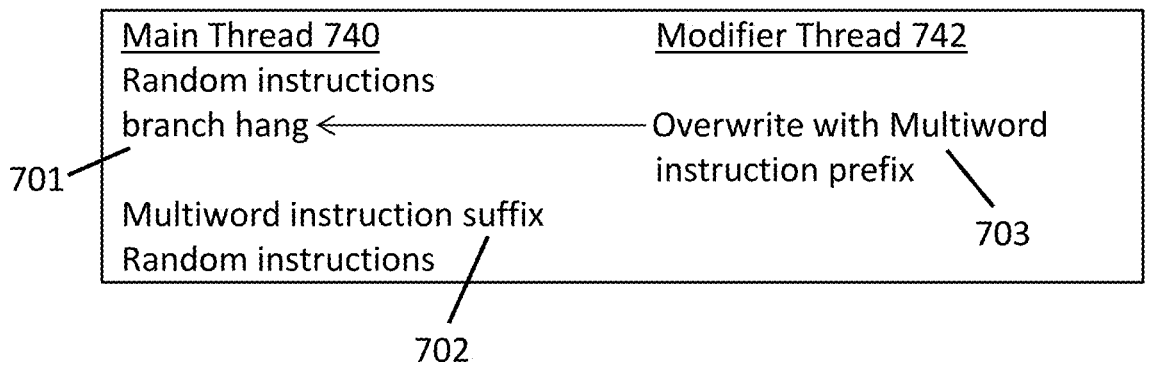
FIG. 7 illustrates another example implementation of functional tests of processor code modification operations in accordance with an embodiment.

FIG. 7 illustrates another example implementation of functional tests of processor code modification operations in accordance with an embodiment. An example pseudocode for a test 700 shown in FIG. 7 is a test for a CMODX operation that overwrites an instruction in the main thread 740 with a multiword instruction prefix. A main thread 740 and a modifier thread 742 can be executed in parallel, where execution of the modifier thread 742 can modify one or more instructions among the main thread 740. For example, execution of the modifier thread 742 can insert one or more additional instructions into the main thread 740, or replace one or more instructions in the main thread 740 with one or more instructions from the modifier thread 742. In the test 700, the main thread 740 can include a branch hang instruction 701, followed by a valid suffix for a multiword instruction 702. The modifier thread 742 may include an instruction 703 that includes a valid multiword instruction prefix. The modifier thread 742 can overwrite the branch hang instruction 701 with the instruction 703 to create a valid multiword instruction that has both a prefix and a suffix. A result of the main thread 740, modified by the modifier thread 742, can indicate whether a valid multiword instruction having a prefix and a suffix was executed, or a suffix of a multiword instruction was executed (e.g., as a standalone instruction). In response to the result indicating that a valid multiword instruction was executed, the test unit (see FIG. 2) can validate that the CMODX operation in the modifier thread of the test 700 is functioning correctly.

Figure 8:
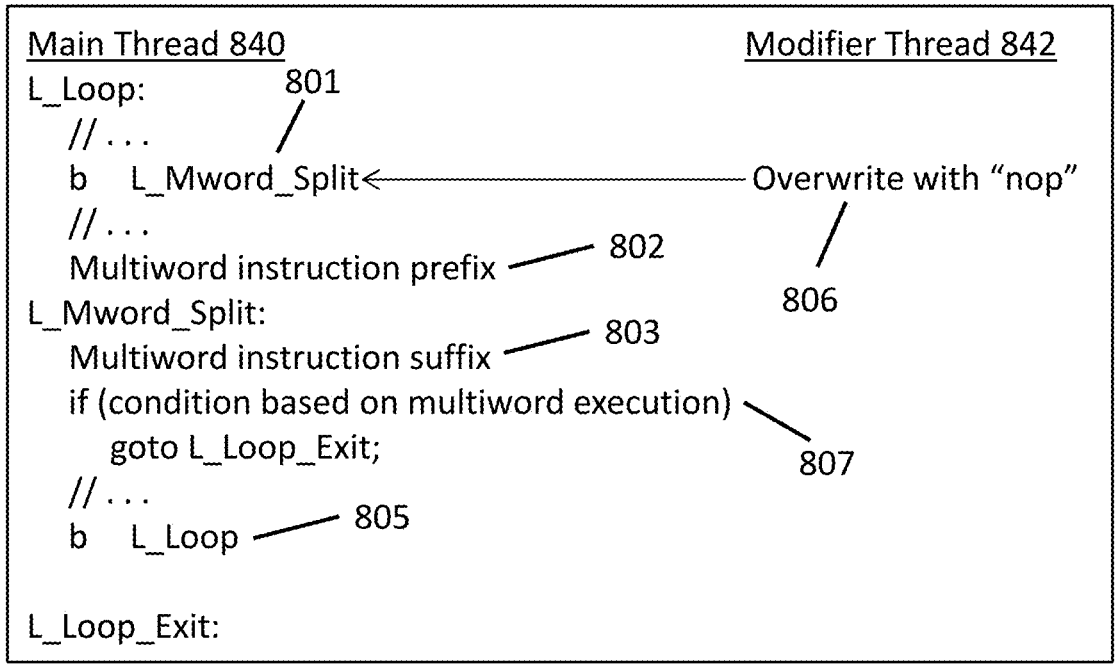
FIG. 8 illustrates another example implementation of functional tests of processor code modification operations in accordance with an embodiment.

FIG. 8 illustrates another example implementation of functional tests of processor code modification operations in accordance with an embodiment. An example pseudocode for a test 800 shown in FIG. 8 is a test for a CMODX operation that overwrites an instruction in the main thread 840 with a nop to execute a multiword prefix and suffix, and break out of a loop in the main thread 840. A main thread 840 and a modifier thread 842 can be executed in parallel, where execution of the modifier thread 842 can modify one or more instructions among the main thread 840. For example, execution of the modifier thread 842 can insert one or more additional instructions into the main thread 840, or replace one or more instructions in the main thread 840 with one or more instructions from the modifier thread 842. In the test 800, the main thread 840 can include a loop having a multiword instruction prefix 802 and a multiword instruction suffix 803. The multiword instruction prefix 802 can be a prefix of a specific multiword instruction, and the multiword instruction suffix 802 can be a suffix of the specific multiword instruction, and is also a valid instruction. A first branch instruction 801 can be placed before the multiword instruction prefix 802, where the first branch instruction 801 can branch to the multiword instruction suffix 803. A second branch instruction 805 follows the multiword instruction suffix 803, where the second branch instruction 805 can branch back to the start of the loop. The loop can continuously execute the multiword instruction suffix 803. The modifier thread 842 in the test 800 can overwrite the first branch instruction 801 with a nop (e.g., instruction 806), which allows the loop to exit and allows the multiword instruction prefix 802 and multiword instruction suffix 803 to be executed. A condition 807 in the main thread 840 can exit the loop in response to the execution of the multiword instruction prefix 802 and multiword instruction suffix 803. In response to the main thread, modified by the modifier thread 842, exiting the loop, the CMODX operation being tested by the test 800 can be validated as functioning correctly.

Figure 9:
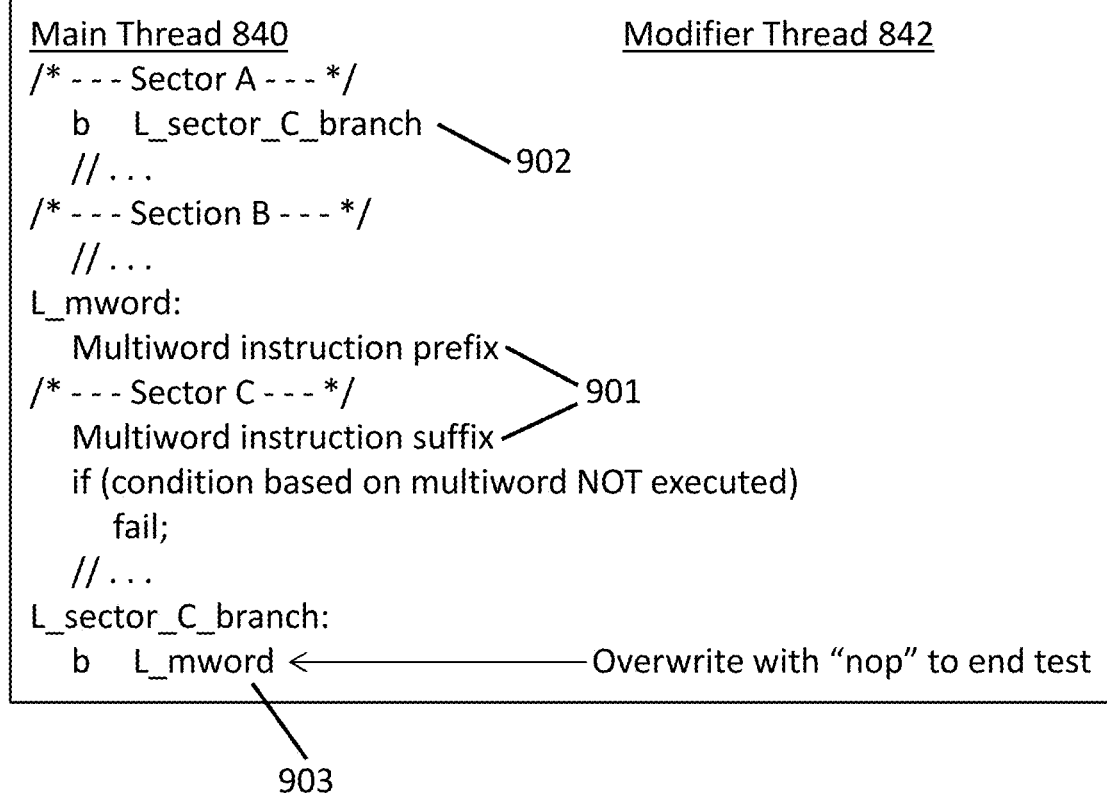
FIG. 9 illustrates another example implementation of functional tests of processor code modification operations in accordance with an embodiment.

FIG. 9 illustrates another example implementation of functional tests of processor code modification operations in accordance with an embodiment. An example pseudocode for a test 900 shown in FIG. 9 is a test for a CMODX operation that overwrites an instruction in the main thread with a nop to avoid execution of a multiword prefix and suffix, and break out of a loop in the main thread. A main thread 940 and a modifier thread 942 can be executed in parallel, where execution of the modifier thread 942 can modify one or more instructions among the main thread 940. For example, execution of the modifier thread 942 can insert one or more additional instructions into the main thread 940, or replace one or more instructions in the main thread 940 with one or more instructions from the modifier thread 942. The test 900 involves three contiguous instruction fetch sectors, A, B, and C. The main thread can include a loop having a multiword instruction 901. A first branch instruction 902 can be placed before the multiword instruction in sector A, where the first branch instruction 902 branches to a second branch instruction 903 in sector C. The second branch instruction branches to the prefix of the multiword instruction 901. The multiword instruction 901 crosses an instruction fetch sector boundary between sectors B and C. The modifier thread can include a CMODX operation to overwrite the second branch instruction with a nop, which causes the loop to exit and the multiword instruction 901 may not be executed. In response to the modified main thread exiting the loop, the CMODX operation being tested by the test 900 can be validated as functioning correctly. In an example, the test 900 can create a scenario where a multiword instruction suffix, which is also a valid instruction, is fetched before the prefix of the multiword instruction.

Figure 10A:
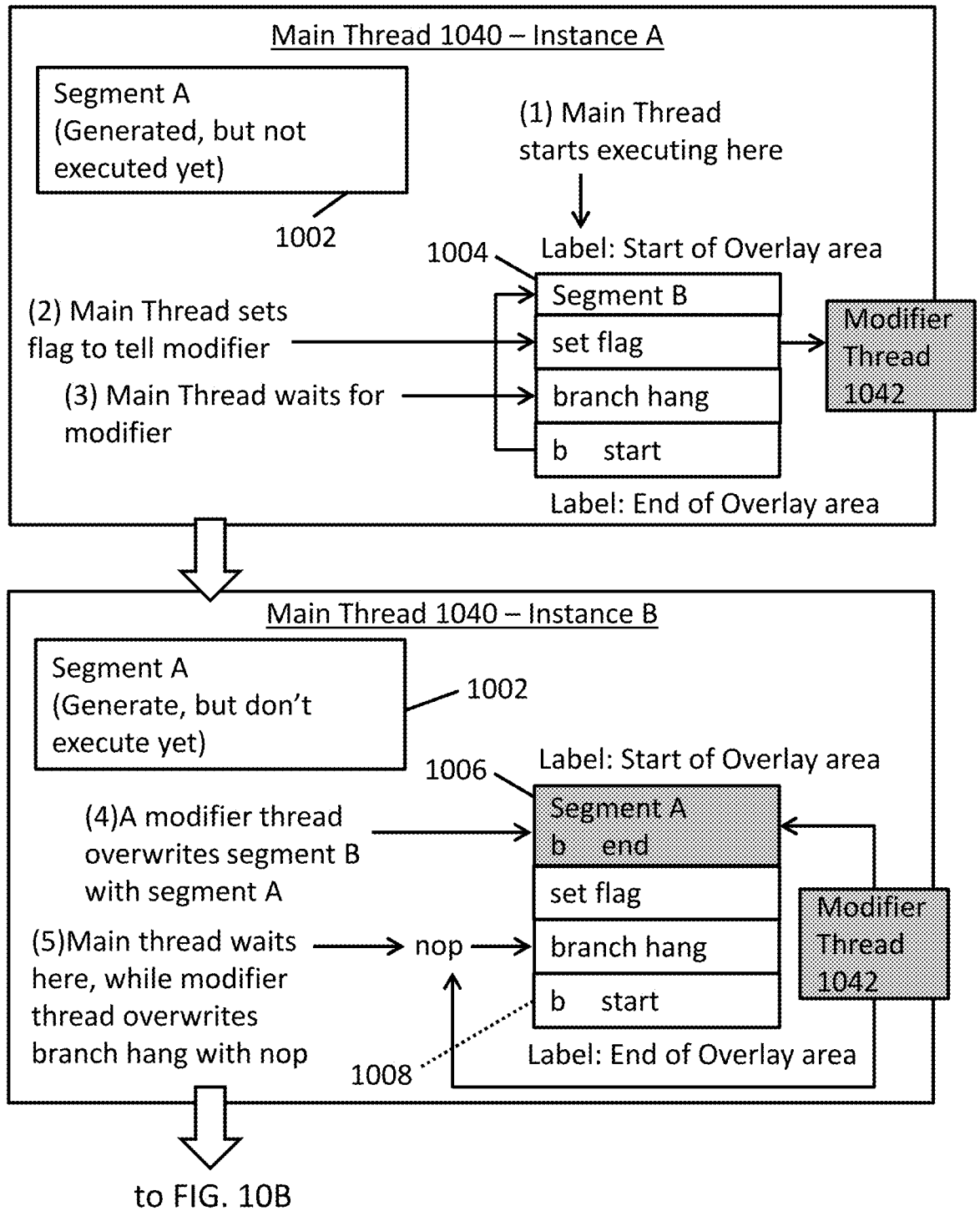
FIG. 10A illustrates a first part of another example implementation of functional tests of processor code modification operations in accordance with an embodiment.
Figure 10B:
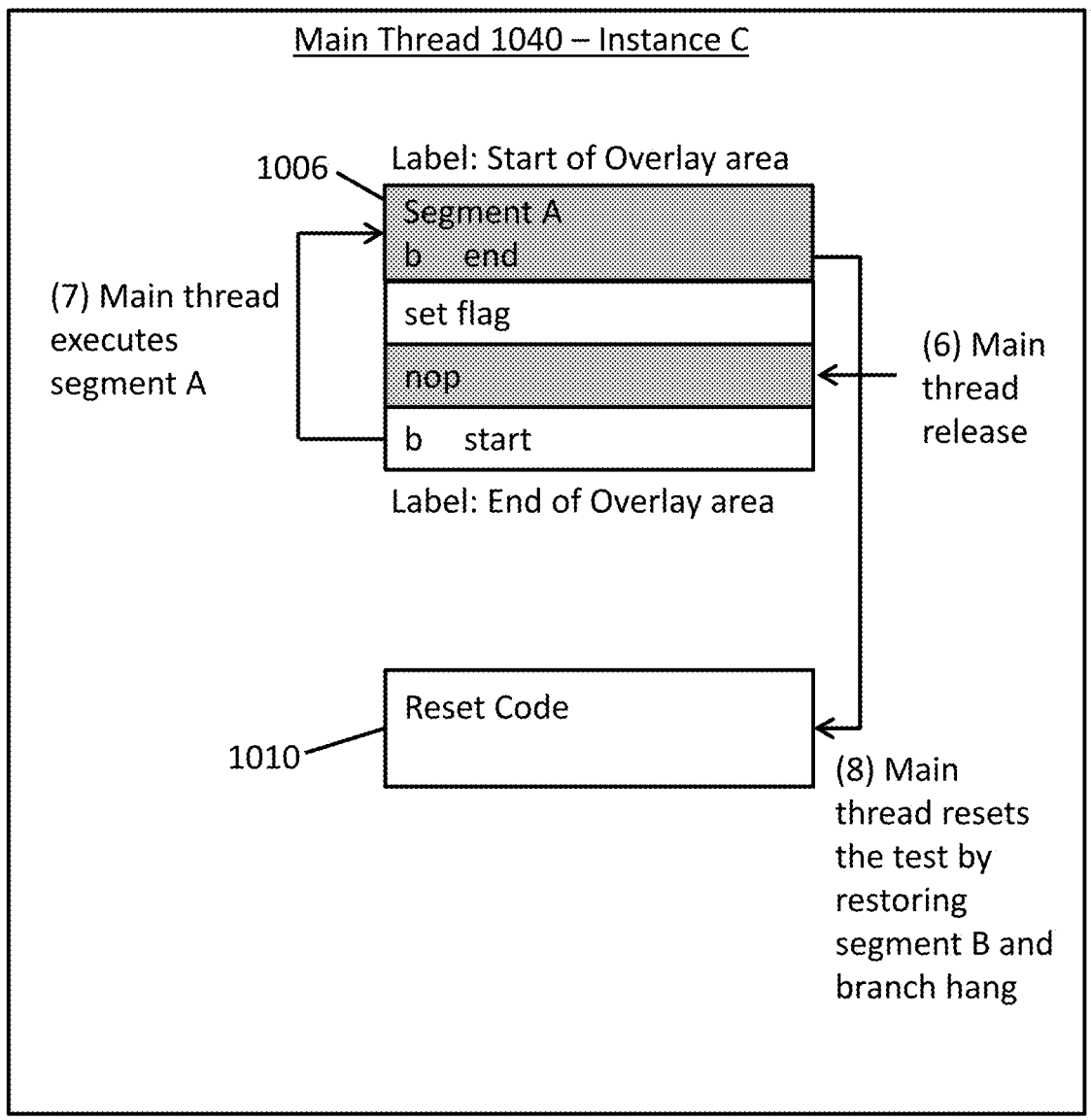
FIG. 10B illustrates a second part of the example implementation shown in FIG. 10A in accordance with an embodiment.

FIG. 10A and FIG. 10B illustrate another example implementation of functional tests of processor code modification operations in accordance with an embodiment. An example pseudocode for a test 1000 shown in FIG. 10A and FIG. 10B is a test for an overlay code modification operation that overwrites a segment of code in a main thread 1040 with another segment of code from a modifier thread 1042. The main thread 1040 can execute an initial segment, then flags the modifier thread 1042 to overwrite the initial segment with a new segment. Thus, the main thread 1040 executes the initial segment before the overwrite, and then executes the new segment after the overwrite. The overwriting performed in the test 1000 can be done by CMODX rules and/or synchronous code modification rules in different variants of the test 1000. Further, the test 1000 can implement consistency checking.

In the example shown in FIGS. 10A and 10B, three instances, instance A, B, C, of the main thread 1040 under the test 1000 are shown. In Instance A, a segment of code 1002, labeled as segment A, of the main thread 1040 can be generated (e.g., initially part of main thread 1040) but not executed yet. Then, in step (1), the main thread 1040 can begin execution of a segment of code 1004, labeled as segment B, where segment B is generated initially part of the main thread 1040. In step (2), the main thread 1040 flags the modifier thread 1042 to tell the modifier thread 1042 that the main thread 1040 is ready for the test 1000 after executing segment B. In step (3), the main thread 1040 waits for the modifier thread 1042 to overwrite a "branch hang" instruction with a nop instruction.

Moving on to Instance B, the modifier thread 1042 can detect the flag set in step (2) and, in response, overlays segment B of the main thread 1040 with segment A in step (4), leading to generation of a modified version of the instruction 1004 (labeled as an instruction 1006). In step (5), upon replacing segment B with segment A, the main thread 1040 can continue to wait while the modifier thread 1042 overwrite the branch hang instruction with a nop instruction. The replacement of the branch hang instruction with the nop instruction can cause the main thread 1040 to exit the wait at step (3) and continue to a next instruction 1008.

Moving on to Instance C in FIG. 10B, in step (6), the nop instruction can release the main thread 1040, such that the main thread 1040 can continue to the instruction 1008. The instruction 1008 can be a branch instruction, "b start", that branches the main thread 1040 back to the instruction 1006. The main thread 1040 can execute segment A in the instruction 1006 in step (7) upon execution of the instruction 1008. In Step (8), the instruction 1006 can include a branch instruction "b end", that allows the main thread 1040 to branch to a reset code 1010 upon completing execution of segment A. The main thread 1040 can execute the reset code 1010 to restore the main thread 1040 back to Instance A in FIG. 10A, such that the instruction 1006 is restored to instruction 1004 and the nop instruction is restored to the branch hang instruction. In an example, the intended fail condition introduced by the test 1000 is to expose any stale instruction or pre-decode data in the instruction cache and instruction fetch unit. For example, the segment A can be a stale instruction or pre-decode data, and the overlayed code (e.g., segment B overlayed by segment A, and the branch hang overlayed by the nop) in Instance C can be executed to expose the segment A.

Figure 11:
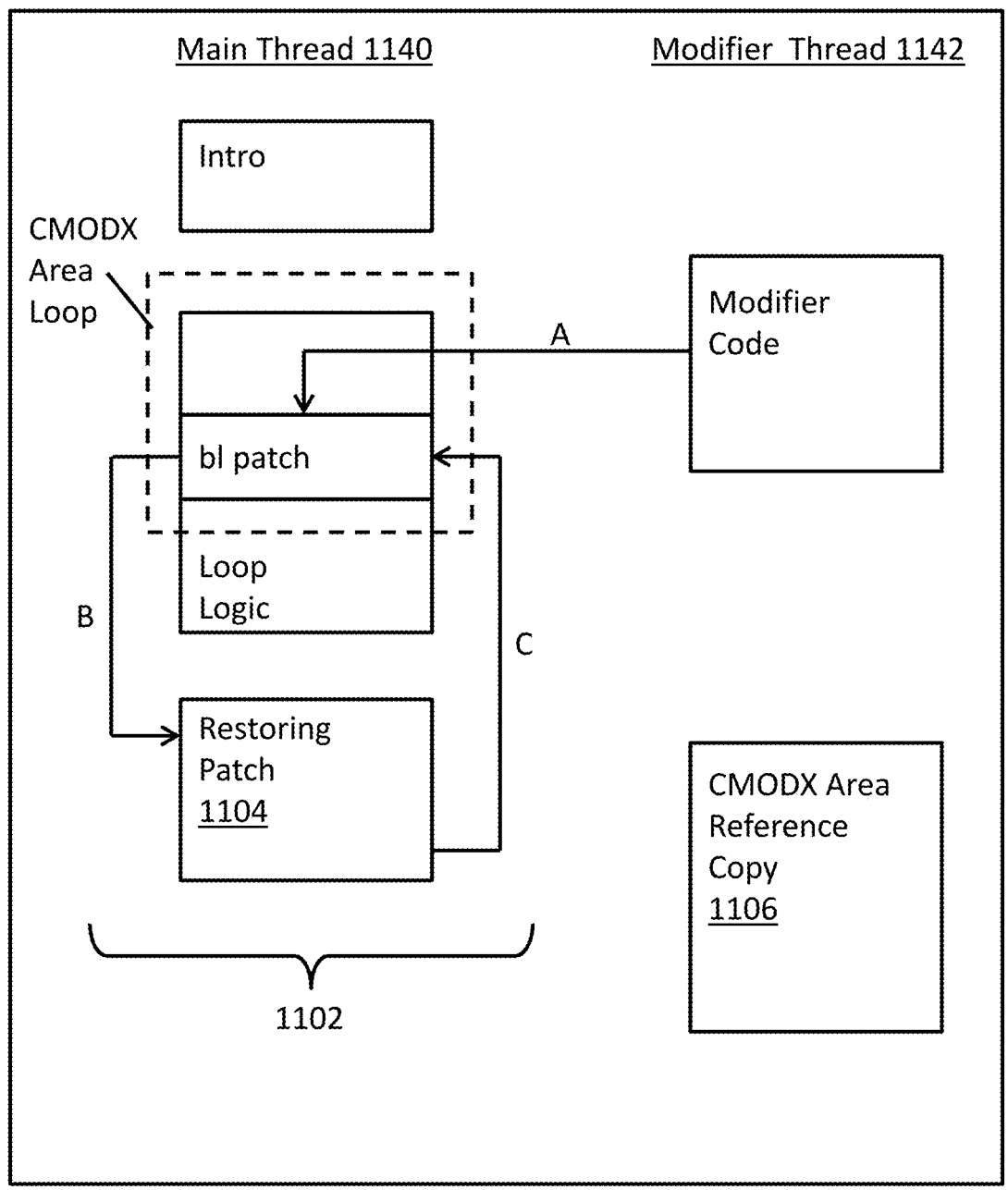
FIG. 11 illustrates another example implementation of functional tests of processor code modification operations in accordance with an embodiment.

FIG. 11 illustrates another example implementation of functional tests of processor code modification operations in accordance with an embodiment. An example pseudocode for a test 1100 shown in FIG. 11 is a test for a CMODX restoring patch operation. A main thread 1140 and a modifier thread 1142 can be executed in parallel, where execution of the modifier thread 1142 can modify one or more instructions among the main thread 1140. For example, execution of the modifier thread 1142 can insert one or more additional instructions into the main thread 1140, or replace one or more instructions in the main thread 1140 with one or more instructions from the modifier thread 1142. In the test 1100, the main thread 1140 is running a test code stream 1102, and the modifier thread 1142 performs a CMODX overwrite of the instructions in the test code stream with branch and link instructions. For example, in a step A, the modifier thread replaces an instruction in the main thread with a branch & link ("bl patch"). The branch and link (link being to set a link register) goes to a restoring patch 1104 in the main thread 1140, that restores the missing instruction from a reference copy 1106 of the code stream 1102. For example, in step B, when the main thread code stream 1102 reaches the replaced instruction (e.g., the instruction that was replaced by "bl patch"), it branches to the restoring patch 1104. In step C, the restoring patch 1104 reads the reference copy 1106 (made during main thread "intro"), and restores the instruction that was replaced by "bl patch". The main thread 1140 can continue to process the code stream 1102 with the restored instruction (e.g., the instruction that was replaced by "bl patch in step A) from the reference copy 1106.

In an example, the purpose of the test 1100 is to allow replacement of any instruction with random timing. The test 1100 can test whether instructions executed speculatively past the replaced instruction are flushed correctly, and execution continues correctly at the restoring patch. For example, a result of the test 1100 can indicate whether the instructions restored by step C were executed or not. If the restored instructions are executed, then the restoring patch is functioning correctly. In an example, the test 1100 can be run with consistency checking if the loop logic in the main thread is executed for a fixed number of times, or can be run in an unchecked mode, where the test 1100 runs until a threshold number of instructions are restored. In another example, a variant of the test 1100 can include replacing the instruction in the main thread with a trap instruction to cause a synchronous interrupt, and making the restoring code an interrupt handler.

Figure 12:
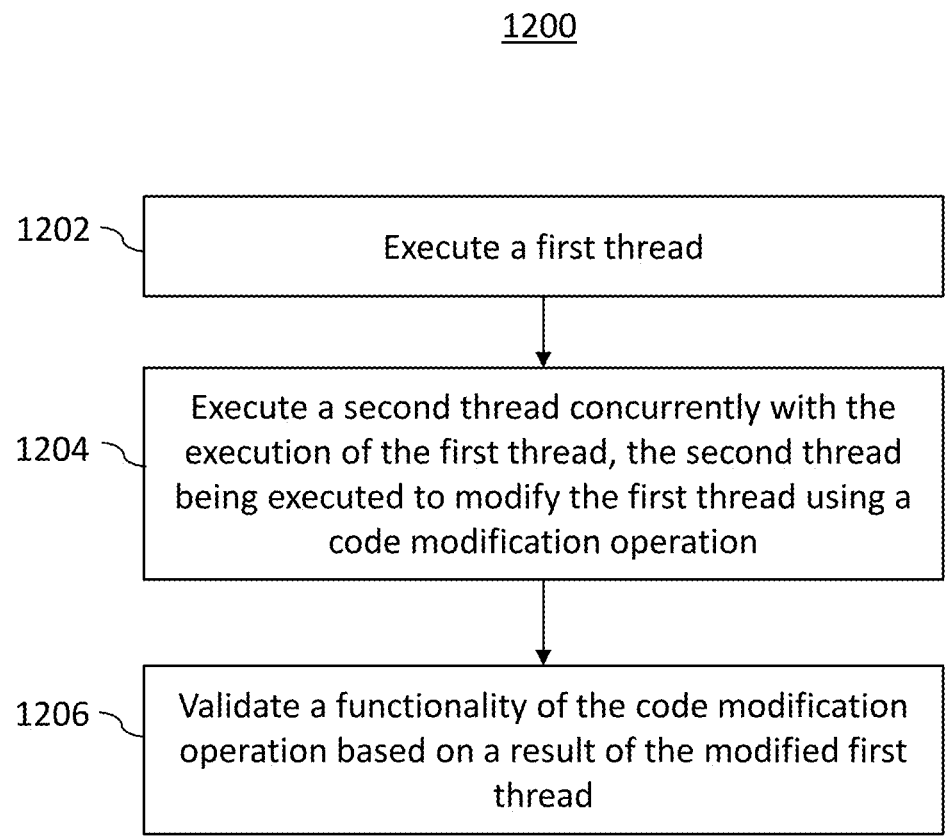
FIG. 12 illustrates an example flowchart describing a process for functional tests of processor code modification operations in an embodiment.

FIG. 12 illustrates an example flowchart describing a process for functional tests of processor code modification operations in an embodiment. The process 1200 can include one or more operations, actions, or functions as illustrated by one or more of blocks 1202, 1204, and/or 1206. Although illustrated as discrete blocks, various blocks can be divided into additional blocks, combined into fewer blocks, eliminated, performed in parallel, or performed in different order, depending on the desired implementation.

The process 1200 can be implemented by a processor to test a functionality of a code modification operation. The process 1200 can begin at block 1202. At block 1202, the processor may execute a first thread. The process 1200 may proceed from block 1202 to block 1204. At block 1204, the processor may execute a second thread concurrently with the execution of the first thread. The second thread may be executed to modify the first thread using a code modification operation. The process 1200 may proceed from block 1204 to block 1206. At block 1206, the processor may validate a functionality of the code modification operation based on a result of the modified first thread.

In an example, the execution of the second thread may introduce an intended fail condition to the first thread. In an example, the code modification operation may replace a segment of code in the first thread with a segment of code in the second thread. In an example, the code modification operation may write a branch operation to the first thread to branch over a specific type of instruction in the first thread to override the specific type of instruction. In an example, the code modification operation may modify a prefix of a multiword instruction in the first thread. In an example, the code modification operation may exit out of a loop of instructions in the first thread. In an example, the code modification operation may replace an instruction in the first thread with a prefix of a multiword instruction, such that the modified first thread includes a valid multiword instruction. In an example, the code modification operation may overlay a segment of code in the first thread with another segment of code, and may restore the segment of code to the first thread in response to a completion of an execution of said another segment of code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A processor comprising:
   at least one hardware component configured to:
   implement a processor pipeline comprising one or more execution units to:
   execute a first thread; and
   execute a second thread concurrently with the execution of the first thread, the second thread being executed to modify the first thread using a code modification operation; and
   implement a test module to validate a functionality of the code modification operation of the second thread based on a result of the modified first thread that indicates whether the second thread successfully performed an action associated with the code modification operation or failed to perform the action associated with the code modification operation.

2. The processor of claim 1, wherein the one or more execution units are implemented to execute the second thread to introduce an intended fail condition to the first thread.

3. The processor of claim 1, wherein the code modification operation replaces a segment of code in the first thread with a segment of code in the second thread.

4. The processor of claim 1, wherein the code modification operation writes a branch operation to the first thread to branch over a specific type of instruction in the first thread to override the specific type of instruction.

5. The processor of claim 1, wherein the code modification operation modifies a prefix of a multiword instruction in the first thread.

6. The processor of claim 1, wherein the code modification operation exits out of a loop of instructions in the first thread.

7. The processor of claim 1, wherein the code modification operation replaces an instruction in the first thread with a prefix of a multiword instruction, such that the modified first thread includes a valid multiword instruction.

8. The processor of claim 1, wherein the code modification operation overlays a segment of code in the first thread with another segment of code, and restores the segment of code to the first thread in response to a completion of an execution of said another segment of code.

9. A computing system comprising:
   a memory; and
   a processor including hardware configured to:
   implement a processor pipeline to:
   execute a first thread; and
   execute a second thread concurrently with the execution of the first thread, the second thread being executed to modify the first thread using a code modification operation; and
   implement a test module configured to validate a functionality of the code modification operation of the second thread based on a result of the modified first thread that indicates whether the second thread successfully performed an action associated with the code modification operation or failed to perform the action associated with the code modification operation.

10. The computer system of claim 9, wherein the processor is configured to implement the processor pipeline to execute the second thread to introduce an intended fail condition to the first thread.

11. The computer system of claim 9, wherein the code modification operation replaces a segment of code in the first thread with a segment of code in the second thread.

12. The computer system of claim 9, processor of claim 1, wherein the code modification operation writes a branch operation to the first thread to branch over a specific type of instruction in the first thread to override the specific type of instruction.

13. The computer system of claim 9, wherein the code modification operation modifies a prefix of a multiword instruction in the first thread.

14. The computer system of claim 9, wherein the code modification operation exits out of a loop of instructions in the first thread.

15. The computer system of claim 9, wherein the code modification operation replaces an instruction in the first thread with a prefix of a multiword instruction, such that the modified first thread includes a valid multiword instruction.

16. The computer system of claim 9, wherein the code modification operation overlays a segment of code in the first thread with another segment of code, and restores the segment of code to the first thread in response to a completion of an execution of said another segment of code.

17. A computer-implemented method comprising:
   executing, by a processor, a first thread;
   executing, by the processor, a second thread concurrently with the execution of the first thread, the second thread being executed to modify the first thread using a code modification operation; and
   validating, by the processor, a functionality of the code modification operation of the second thread based on a result of the modified first thread that indicates whether the second thread successfully performed an action associated with the code modification operation or failed to perform the action associated with the code modification operation.

18. The computer-implemented method of claim 17, wherein executing the second thread comprises introducing an intended fail condition to the first thread.

19. The computer-implemented method of claim 17, wherein executing the second thread comprises replacing a segment of code in the first thread with a segment of code in the second thread.

20. The computer-implemented method of claim 17, wherein executing the second thread comprises modifying a prefix of a multiword instruction in the first thread.

* * * * *